US012789938B2

(12) United States Patent
Kim

(10) Patent No.: US 12,789,938 B2
(45) Date of Patent: Nov. 10, 2026

(54) LEAN ACTUATOR AND MOBILITY MEANS COMPRISING SAME

(71) Applicant: HL MANDO CORPORATION, Gyeonggi-do (KR)

(72) Inventor: Jeong Hwan Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 19/112,233

(22) PCT Filed: Mar. 13, 2024

(86) PCT No.: PCT/KR2024/003210
§ 371 (c)(1),
(2) Date: Mar. 14, 2025

(87) PCT Pub. No.: WO2025/037691
PCT Pub. Date: Feb. 20, 2025

(65) Prior Publication Data
US 2026/0091839 A1 Apr. 2, 2026

(30) Foreign Application Priority Data
Aug. 11, 2023 (KR) ........................ 10-2023-0105554

(51) Int. Cl.
*B62K 5/10* (2013.01)
*B60G 5/04* (2006.01)
(Continued)

(52) U.S. Cl.
CPC .................. *B62K 5/10* (2013.01); *B60G 5/04* (2013.01); *B62J 45/4151* (2020.02);
(Continued)

(58) Field of Classification Search
CPC . B62K 5/10; B62K 5/05; B62K 5/027; B62K 5/08; B62K 5/023; B62K 5/025;
(Continued)

(56) References Cited

U.S. PATENT DOCUMENTS 3,161,082 A * 12/1964 Walton .................. F16H 49/001 74/640
4,964,322 A 10/1990 Reiterman
(Continued)

FOREIGN PATENT DOCUMENTS

CN 103124671 5/2013
CN 114007923 2/2022
(Continued)

OTHER PUBLICATIONS

"Strain wave gearing" article from Wikipedia; https://en.wikipedia.org/wiki/Strain_wave_gearing; Feb. 10, 2026 (Year: 2026).*
(Continued)

*Primary Examiner* — Keith J Frisby
(74) *Attorney, Agent, or Firm* — WOMBLE BOND DICKINSON (US) LLP

(57) ABSTRACT

According to the present embodiments, a lean actuator and a mobility means comprising same can be provided, the lean actuator comprising: a motor; an input shaft which is coupled to a motor shaft of the motor; a reducer which has an output shaft, to which a lean bar is coupled, and is coupled to the input shaft; and a housing which accommodates the reducer, and to which the motor is coupled.

17 Claims, 10 Drawing Sheets

100

(51) Int. Cl.
*B62J 45/415* (2020.01)
*F16H 49/00* (2006.01)

(52) U.S. Cl.
CPC ....... *F16H 49/001* (2013.01); *B60G 2300/45* (2013.01); *B60G 2400/0511* (2013.01); *B60G 2800/012* (2013.01)

(58) Field of Classification Search
CPC ...... B62K 5/00; B62K 5/02; B62K 2005/001; B60G 5/04; B60G 2300/45; B60G 2300/122; B60G 21/007; B60G 21/005; B60G 2202/42; B60G 2202/442; B60G 17/0162; B60G 17/005; B60G 17/015; B60G 17/0157; B60G 2400/0511; B60G 2800/012; B60G 2204/419; B60G 2204/46; B62D 9/02; B62D 9/04; B62D 61/06; B62D 61/08; B62J 45/4151; B62J 45/415; B62J 45/413; F16H 49/001; B60Y 2200/12; B60Y 2200/122; B60Y 2200/124
USPC ......... 280/5.509, 124.103, 5.508, 5.5, 5.506, 280/6.15; 180/210; 701/37
See application file for complete search history.

(56) References Cited

U.S. PATENT DOCUMENTS

| | | | | |
|---|---|---|---|---|
| 6,561,451 | B1* | 5/2003 | Steinich | B66B 11/0075 242/563.2 |
| 10,513,291 | B2* | 12/2019 | Kato | B60G 7/001 |
| 11,897,549 | B2 | 2/2024 | Jeon | |
| 2009/0016833 | A1* | 1/2009 | Elrod | B23Q 17/10 409/203 |
| 2010/0072725 | A1 | 3/2010 | Woellhaf et al. | |
| 2011/0278905 | A1* | 11/2011 | Ikeda | B60R 22/34 324/207.13 |
| 2013/0193656 | A1 | 8/2013 | Itoh et al. | |
| 2018/0264905 | A1* | 9/2018 | Kimura | B62J 45/414 |
| 2018/0334001 | A1* | 11/2018 | Kato | B60G 7/008 |
| 2021/0269017 | A1 | 9/2021 | Araki et al. | |
| 2022/0048564 | A1* | 2/2022 | Van Den Brink | B62D 61/08 |
| 2022/0348250 | A1 | 11/2022 | Jeon | |
| 2023/0192221 | A1 | 6/2023 | Sharad et al. | |
| 2023/0250865 | A1* | 8/2023 | Wang | F16H 49/001 74/413 |
| 2023/0364959 | A1* | 11/2023 | Jung | B60G 17/0162 |

FOREIGN PATENT DOCUMENTS

| | | | |
|---|---|---|---|
| DE | 10 2016 216 481 | 3/2018 | |
| EP | 3 412 481 | 12/2018 | |
| JP | 2011-46295 | 3/2011 | |
| JP | 5320150 | 7/2013 | |
| JP | 5447683 | 3/2014 | |
| JP | 2018-203148 | 12/2018 | |
| JP | 2019-156329 | 9/2019 | |
| JP | 2019196108 A * | 11/2019 | B60G 17/0185 |
| KR | 10-2020-0144973 | 12/2020 | |
| KR | 10-2552219 | 7/2023 | |
| WO | WO-2006006859 A2 * | 1/2006 | B60G 21/007 |
| WO | WO-2011107674 A1 * | 9/2011 | B62K 5/10 |

OTHER PUBLICATIONS

"What Is the Difference Between a Spline and a Keyway" article; https://www.afiparts.com/spline-vs-keyway; Nov. 10, 2025 (Year: 2025).*
International Search Report for PCT/KR2024/003210 mailed on Jun. 12, 2024 and its English translation from WIPO (published as WO2025/037691). Searching Authority for PCT/KR2024/003210 mailed on Jun. 12, 2024 and its (published as WO2025/037691).
Written Opinion of the International English translation by Google Translate.
Office Action dated Mar. 17, 2026 for Japanese Patent Application No. 2025-514848 and its English translation provided by Applicant's foreign counsel.
Office Action dated Apr. 7, 2026 For Taiwan Patent Application No. 113109415 and Its English Translation provided by Applicant's foreign counsel.
Extended European Search Report dated Jun. 23, 2026 for European Patent Application No. 24854245.8.

* cited by examiner

LEAN ACTUATOR AND MOBILITY MEANS COMPRISING SAME

This application is the U.S. National Stage of International Patent Application No. PCT/KR2024/003210 filed on Mar. 13, 2024, which claims the priority to Korean Patent Application No. 10-2023-0105554 filed in the Korean Intellectual Property Office on Aug. 11, 2023, the entire contents of which are incorporated herein by reference.

TECHNICAL FIELD

The present embodiments relate to a lean actuator and a mobility vehicle including the same.

BACKGROUND ART

Recently, interest in small mobility vehicles has been increasing. Small mobility vehicles may be used as urban mobility vehicles suitable for a small number of passengers and short distance travel.

However, mobility vehicles are designed to have a heavy vehicle body and a high center of gravity, which may cause deterioration of driving stability while cornering or turning. To address such issue while allowing the driver to enjoy dynamic driving, the mobility vehicle may be equipped with a so-called lean system that performs a lean function of tilting the vehicle body depending on the driving direction.

The lean system of a small mobility vehicle includes a lean actuator for tilting the vehicle body. However, by the nature of the lean function which tilts the vehicle body, safety issues may arise, leading to the need for high accuracy in lean angle control.

The small mobility vehicle further includes a steering input device for the driver to input steering wheel manipulation and a steering actuator for generating a steering force for steering the wheels according to the steering wheel manipulation.

Given their small body and uses, small mobility vehicles require that various devices equipped therein be small in size.

DETAILED DESCRIPTION OF THE INVENTION

Technical Problem

Conceived in the foregoing background, the present embodiments relate to a lean actuator having a compact structure and capable of sensing the lean angle with high accuracy and a mobility vehicle including the lean actuator.

Technical Solution

According to the present embodiments, there may be provided a lean actuator comprising a motor, an input shaft coupled to a motor shaft of the motor, a reducer having an output shaft coupled with a lean bar, and coupled to the input shaft, and a housing receiving the reducer and coupled with the motor.

According to the present embodiments, there may be provided a mobility vehicle comprising a lean actuator including a motor, an input shaft coupled to a motor shaft of the motor, a reducer having an output shaft coupled with a lean bar, and coupled to the input shaft, and a housing receiving the reducer and coupled with the motor.

Advantageous Effects

According to the present embodiments, there may be provided a lean actuator having a compact structure and capable of sensing the lean angle with high accuracy and a mobility vehicle including the lean actuator.

MODE FOR CARRYING OUT THE INVENTION

Figure 1:
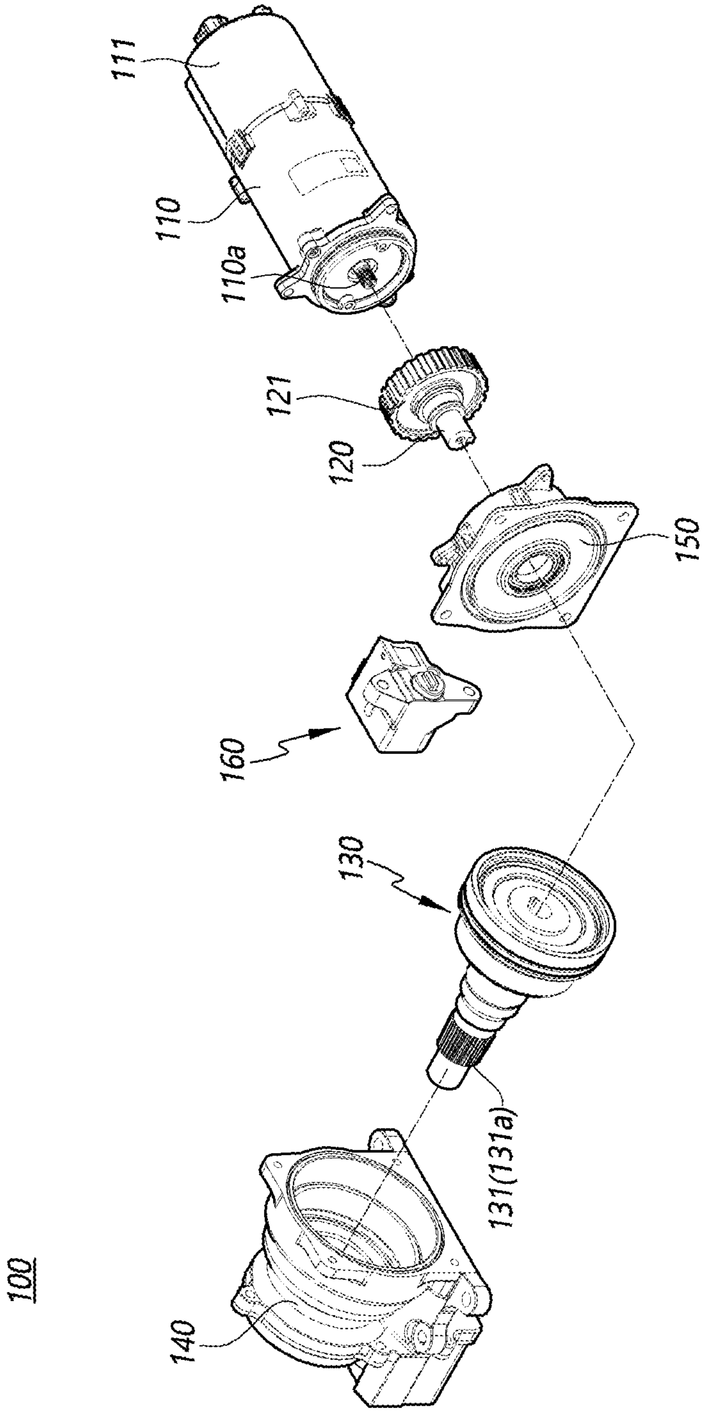
FIG. 1 is an exploded perspective view illustrating a lean actuator according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Figure 2:
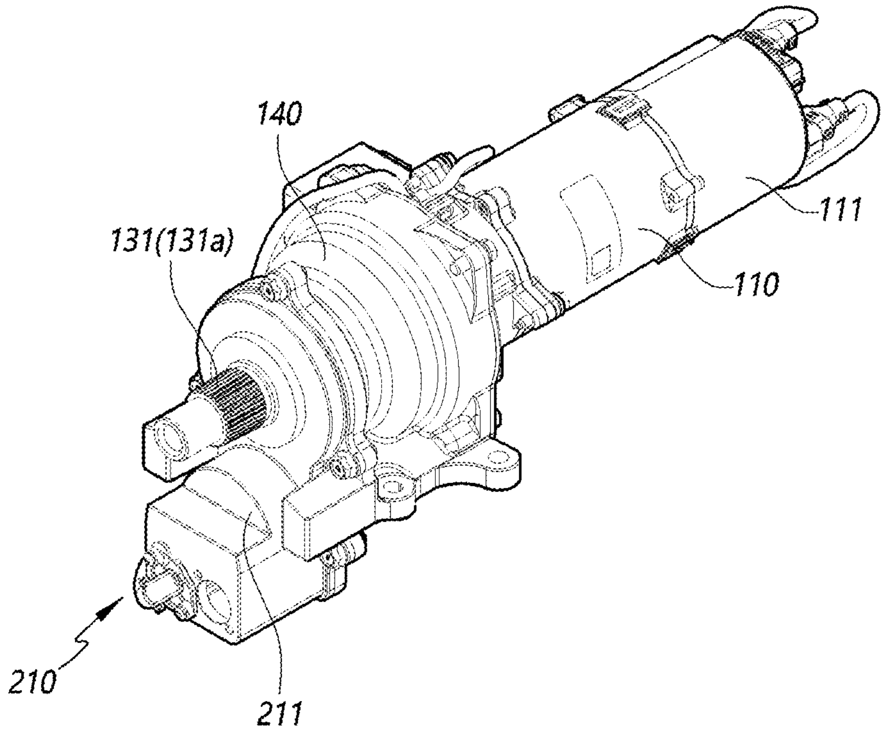
FIG. 2 is a perspective view illustrating a lean actuator according to the present embodiments.
Figure 3:
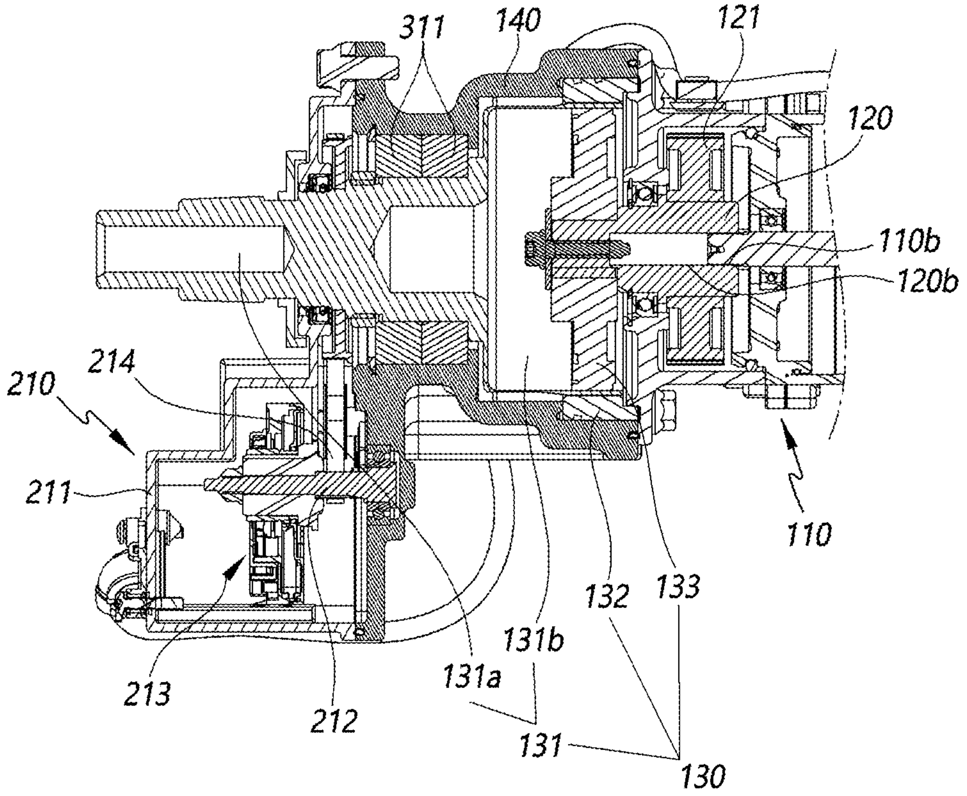
FIG. 3 is a cross-sectional view illustrating a lean actuator according to the present embodiments.
Figure 4:
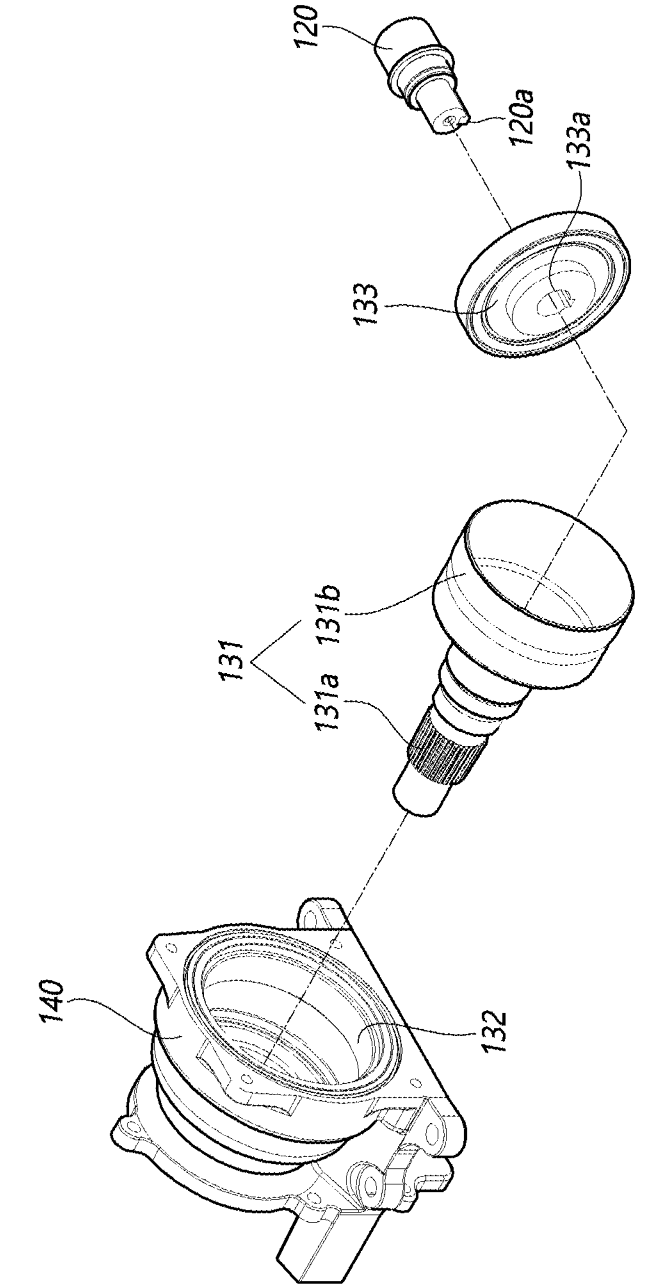
FIG. 4 is an exploded perspective view illustrating a portion of a lean actuator according to the present embodiments.
Figure 5:
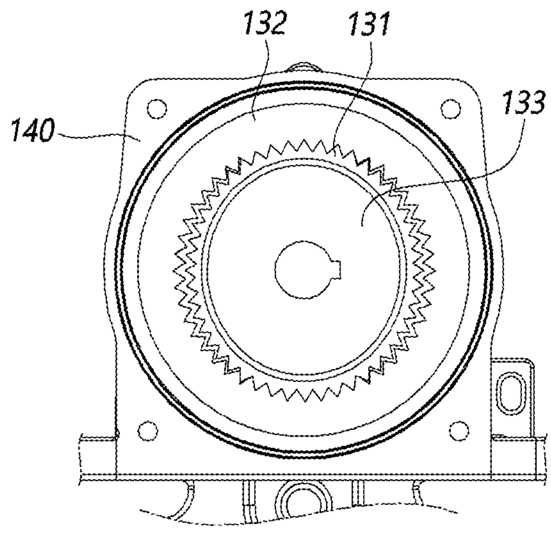
FIG. 5 is a front view illustrating a portion of a lean actuator according to the present embodiments.
Figure 6:
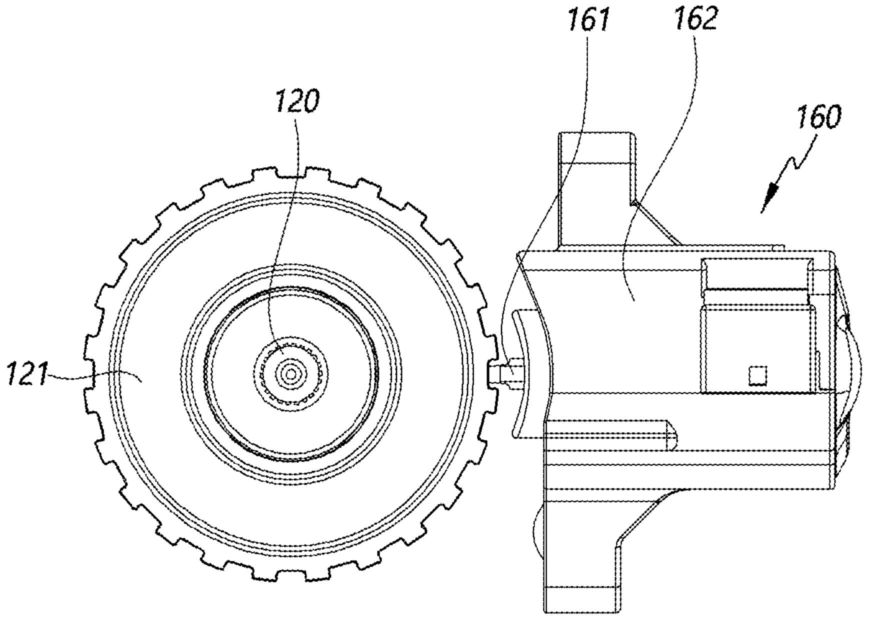
FIG. 6 is a front view illustrating a portion of a lean actuator according to the present embodiments.
Figure 7:
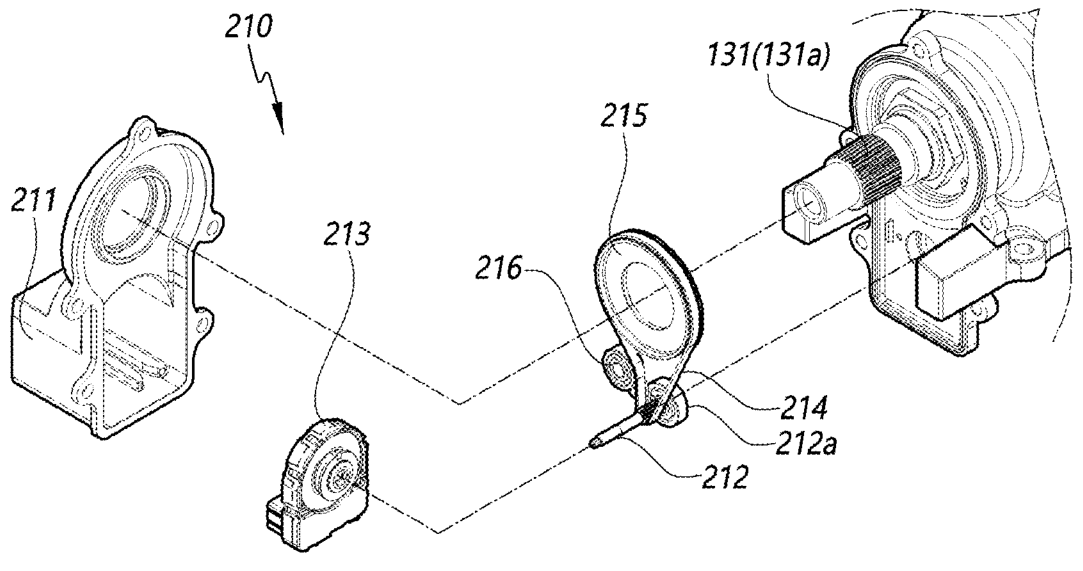
FIG. 7 is an exploded perspective view illustrating a portion of a lean actuator according to the present embodiments.
Figure 8A:
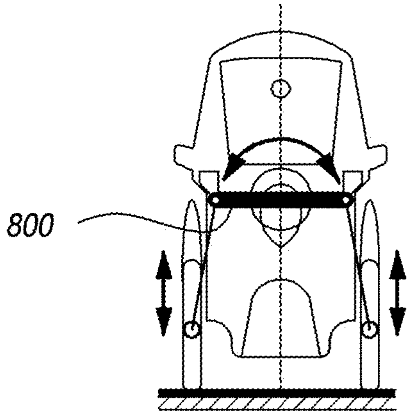
FIGS. 8A, 8B, and 8C are views illustrating a lean actuator and a mobility vehicle according to the present embodiments.
Figure 8B:
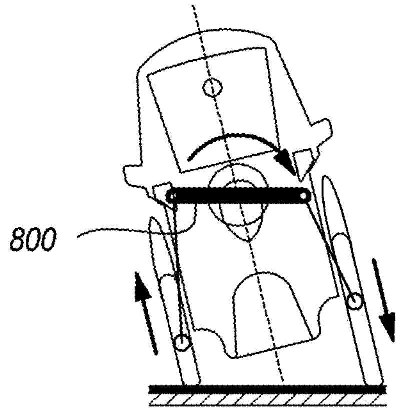
Figure 8C:
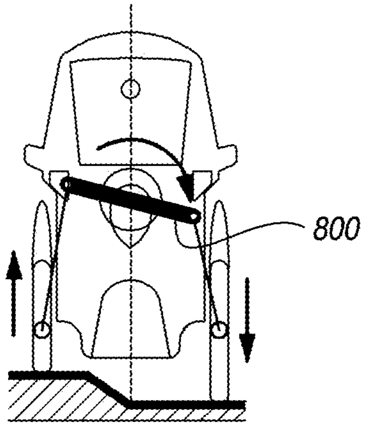

FIG. 1 is an exploded perspective view illustrating a lean actuator according to the present embodiments. FIG. 2 is a perspective view illustrating a lean actuator according to the present embodiments. FIG. 3 is a cross-sectional view illustrating a lean actuator according to the present embodiments. FIG. 4 is an exploded perspective view illustrating a portion of a lean actuator according to the present embodiments. FIG. 5 is a front view illustrating a portion of a lean actuator according to the present embodiments. FIG. 6 is a front view illustrating a portion of a lean actuator according to the present embodiments. FIG. 7 is an exploded perspective view illustrating a portion of a lean actuator according to the present embodiments. FIGS. 8A, 8B, and 8C are views illustrating a lean actuator and a mobility vehicle according to the present embodiments.

According to the present embodiments, there may be provided a lean actuator 100 including a motor 110, an input shaft 120 coupled to a motor shaft 110*a* of the motor 110, a reducer having an output shaft 131 coupled with a lean bar and coupled to the input shaft, and a housing 140 receiving the reducer 130 and coupled with the motor 110.

According to the present embodiments, there may also be provided a mobility vehicle including the lean actuator 100.

The lean function of the mobility vehicle according to the present embodiments is described with reference to FIGS. 8A to 8C. FIG. 8A illustrates a state in which the lean function of the mobility vehicle according to the present embodiments is not performed, e.g., stop, advance, or reverse state.

FIGS. 8B and 8C illustrate states in which the lean function of the mobility vehicle according to the present embodiments is performed. FIG. 8B illustrates a state in which the vehicle body is tilted by the lean function while turning, and FIG. 8C illustrates a state in which the heights of the left and right wheels are offset by the lean function in a stepped area.

In other words, the use of the lean function may enhance driving stability while turning and provide a dynamic driving environment to the user while providing suspension against the stepped ground surface.

The mobility vehicle according to the present embodiments includes a lean bar 800 of which two opposite ends are connected to the left and right wheels to perform the lean function. The two opposite ends of the lean bar 800 are connected to the left and right wheels through a linkage structure. The wheel connected with the lean bar 800 may be the front or rear wheels.

A mobility vehicle according to the present embodiments includes a lean actuator 100. As the lean bar 800 is rotated by the lean actuator 100, the lean function is performed.

Referring to FIGS. 1 to 3, a lean actuator 100 according to the present embodiments includes a motor 110, an input shaft 120, a reducer 130 having an output shaft 131, and a housing 140.

The power of the motor 110 is transferred to the reducer 130 through the input shaft 120, and the reduced power is transferred to the output shaft 131. A lean bar is coupled to the output shaft 131. Therefore, the lean bar may be rotated by the power of the motor 110.

According to an embodiment, the lean actuator 100 according to the present embodiments may further include an electronic control unit 111 controlling the rotation direction and rotation speed of the motor 110. The electronic control unit 111 may receive information sensed by various sensors equipped in the mobility vehicle, e.g., the driver's steering wheel steering angle, rotational angle of the lean bar, vehicle velocity, and yaw rate information, and control the motor 110 based on the received information.

According to an embodiment, the motor shaft 110*a* and the input shaft 120 may be coupled via serrations 110*b* and 120*b* formed on either thereof. FIG. 3 illustrates an example in which both the motor shaft 110*a* and the input shaft 120 have serrations 110*b* and 120*b*.

The input shaft 120 coupled to the motor shaft 110*a*, together with a locking gear 121, is received in a housing cover 150. An end portion of the input shaft 120 protrudes from a sensor cover 210 and is coupled with the reducer 130. A locking member 160 is coupled to one side of the housing cover 150.

According to an embodiment, the output shaft 131 may have a coupling portion with serrations where the lean bar is coupled.

The housing 140 receives the reducer 130, and the coupling portion 131*a* of the output shaft 131 protrudes from the housing 140. The lean bar is coupled to the coupling portion 131*a* of the output shaft 131 protruding from the housing 140. The lean bar and the coupling portion 131*a* may be coupled to each other via serrations, and a nut may be coupled to the coupling portion 131*a* to fix the lean bar to the output shaft 131.

According to an embodiment, the housing 140 may be coupled with a bearing 311 that supports rotation of the output shaft 131. As is described below in detail, an end of the output shaft 131 is provided between a fixed gear 132, as a gear portion 131*b*, and a rotating cam 133, and the other end of the output shaft 131 may be coupled with the lean bar as the coupling portion 131*a*. The bearing 311 may support a middle portion of the output shaft 131 to the housing 140.

Referring to FIGS. 3 and 4, according to an embodiment, the reducer 130 includes a rotating cam 133 coupled with the input shaft 120 and a fixed gear 132 coupled to the housing 140, and the output shaft 131 may include a gear portion 131*b* coupled with the rotating cam 133 and engaged with the fixed gear 132.

In other words, the reducer 130 may include the output shaft 131, the rotating cam 133, and the fixed gear 132, and the output shaft 131 may include the coupling portion 131*a* and the gear portion 131*b*.

Although not shown in FIGS. 1 to 4 for convenience of illustration and understanding, as shown in FIG. 5, gear teeth may be formed on an inner surface of the fixed gear 132 having an outer surface supported by the housing 140 while being coupled, and gear teeth engaged with the gear teeth of the fixed gear 132 may be formed on an outer surface of the gear portion 131*b* of the output shaft 131.

The gear portion 131*b* of the output shaft 131 is formed as a hollow having an oval shape, and gear teeth engaged with the gear teeth of the fixed gear 132 are formed on the outer surface of the gear portion 131*b*, and the rotating cam 133 is coupled to the inner surface of the gear portion 131*b*. A bearing may be provided between the rotating cam 133 and the gear portion 131*b*.

The rotating cam 133 is coupled with the input shaft 120 to be rotated by the power of the motor 110, and the power of the motor 110 is reduced by the rotating cam 133, the gear portion 131*b*, and the fixed gear 132 and output to the output shaft 131. According to an embodiment, the reducer 130 may be a harmonic reducer.

According to an embodiment, a key pin 120*a* may be coupled to an outer surface of the input shaft 120, and the rotating cam 133 may have a key recess 133*a* engaged with the key pin 120*a*. A depressed recess is formed in the outer surface of the input shaft 120, so that the key pin 120*a* may be inserted into the depressed recess to be coupled to the input shaft 120. As the key pin 120*a* is inserted into the key recess 133*a* of the rotating cam 133, the input shaft 120 and the rotating cam 133 may be circumferentially fixed.

Referring to FIGS. 1 and 6, the lean actuator 100 according to the present embodiments may further include a locking member 160 for restricting rotation of the lean bar.

The rotation of the lean bar may be restricted by the operation of the locking member 160, rendering it impossible to perform the lean function of the mobility vehicle according to the present embodiments. For example, in a context where the lean function is unnecessary, such as when the vehicle moves forward or back or stops, or the vehicle body is required to be in upright position, the locking member 160 may be operated to allow the lean bar to remain in the horizontal state.

According to an embodiment, the locking member 160 may lock the rotation of the input shaft 120, restricting the rotation of the lean bar.

According to an embodiment, a locking gear 121 may be coupled to the input shaft 120, and the locking member 160 may include a locking pin 161 that advances to engage with the locking gear 121 or reverses to disengage from the locking gear 121 and a driving unit 162 that advances or reverses the locking pin 161.

The locking pin 161 may be advanced or reversed by the driving unit 162. In the advanced state of the locking pin 161, an end portion thereof may be engaged with the gear teeth of the locking gear 121, so that rotation of the locking gear 121 and the input shaft 120 coupled with the locking gear 121 may be restricted, and so may the rotation of the lean bar 800.

In the reversed state of the locking pin 161, an end portion thereof may be disengaged from the gear teeth of the locking gear 121, so that the input shaft 120 and the lean bar may be rotated by the motor 110. The locking gear 121 may be coupled to the input shaft 120 via serrations.

Referring to FIGS. 3 and 7, the lean actuator 100 according to the present embodiments may further include a sensor unit 210 sensing the rotational angle of the output shaft 131. In other words, the sensor unit 210 may sense the rotational angle of the lean bar coupled to the output shaft 131.

The rotational angle information about the output shaft 131, sensed by the sensor unit 210, may be transmitted to the electronic control unit 111, and the electronic control unit 111 may control the motor 110 using the rotational angle information about the output shaft 131.

According to an embodiment, the sensor unit 210 may include a rotational shaft 212 rotated in conjunction with the output shaft 131 and a sensor 213 sensing the rotational angle of the rotational shaft 212. The sensor 213 senses the rotational angles of the output shaft 131 and the lean bar from the rotational angle of the rotational shaft 212. The sensor 213 and the rotational shaft 212 may be received inside the sensor cover 211 coupled to the housing 140.

According to an embodiment, the gear ratio of the rotational shaft 212 to the output shaft 131 may be larger than 1. Accordingly, the sensor 213 sensing the rotational angle of the output shaft 131 from the rotational angle of the rotational shaft 212 may more accurately sense the rotational angle of the output shaft 131.

Since the gear ratio of the rotational shaft 212 to the output shaft 131 is larger than 1, the accuracy of the sensor 213 is enhanced as compared with when the rotational angle of the output shaft 131 is directly sensed.

According to an embodiment, an end of the rotational shaft 212 may be coupled to the sensor 213, and the other end of the rotational shaft 212 may be supported by the bearing 212*a* coupled to the housing 140. In other words, the two opposite ends of the rotational shaft 212 may be supported by the sensor 213 and the bearing 212*a*, respectively.

According to an embodiment, the output shaft 131 and the rotational shaft 212 may be connected through a belt 214. In other words, the output shaft 131 and the rotational shaft 212 may be disposed horizontally, and be connected through the belt 214 so that the rotational shaft 212 may be rotated in conjunction with the output shaft 131.

According to an embodiment, a pulley 215 around which the belt 214 is wound may be coupled to the output shaft 131. As shown in the drawings, the rotational shaft 212 may have gear teeth engaged with the pulley 215. Or, the pulley around which the belt 214 is wound may be coupled to the rotational shaft 212.

According to an embodiment, the diameter of the pulley 215 may be larger than the diameter of the rotational shaft 212. Accordingly, the gear ratio of the rotational shaft 212 to the output shaft 131 may be larger than 1, and the accuracy of the sensor 213 may be enhanced.

According to an embodiment, there may be provided a bearing 216 pressurizing the outer surface of the belt 214. The bearing 214 pressurizes the belt 214 while being supported on the outer surface of the belt 214. Accordingly, the tension of the belt 214 may be maintained while preventing a slip or jump between the belt 214 and the pulley 215 and/or between the belt 214 and the rotational shaft 212.

By the so-structured lean actuator and the mobility vehicle including the same, it is possible to sense the lean angle with high accuracy while providing a compact structure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

The invention claimed is:

1. A lean actuator, comprising:

a motor;

an input shaft coupled to a motor shaft of the motor;

a reducer having an output shaft coupled with a lean bar, and coupled to the input shaft;

a housing receiving the reducer and coupled with the motor;

a locking gear coupled to the input shaft; and a housing cover accommodating the input shaft and the locking gear and coupled between the housing and the motor, wherein the reducer comprises a rotating cam coupled to the input shaft and a fixed gear coupled to the housing, wherein an end portion of the input shaft protrudes in an axial direction from the housing cover and is coupled to the rotating cam, wherein a first end portion of the output shaft includes a gear portion having an inner surface coupled to the rotating cam and an outer surface engaged with the fixed gear, wherein a second end portion of the output shaft protrudes in the axial direction from the housing and includes a coupling portion formed with serrations to be coupled to the lean bar, and wherein a middle portion of the output shaft is supported on the housing by a bearing.

2. The lean actuator of claim 1, further comprising an electronic control unit controlling the motor.

3. The lean actuator of claim 1, wherein at least one of the motor shaft or the input shaft have serrations.

4. The lean actuator of claim 1, wherein the reducer is a harmonic reducer.

5. The lean actuator of claim 1, wherein a key pin is coupled to an outer surface of the input shaft, and the rotating cam has a key recess engaged with the key pin.

6. The lean actuator of claim 1, further comprising a locking member for restricting rotation of the lean bar.

7. The lean actuator of claim 6, wherein the locking member locks rotation of the input shaft to restrict rotation of the lean bar.

8. The lean actuator of claim 6, wherein the locking member includes:

a locking pin advancing to engage with the locking gear or reversing to disengage from the locking gear; and a driving unit advancing or reversing the locking pin.

9. The lean actuator of claim 1, further comprising a sensor unit sensing a rotational angle of the output shaft.

10. The lean actuator of claim 9, wherein the sensor unit includes:

a rotational shaft rotating in conjunction with the output shaft; and a sensor sensing a rotational angle of the rotational shaft.

11. The lean actuator of claim 10, wherein a gear ratio of the rotational shaft to the output shaft is larger than 1.

12. The lean actuator of claim 10, wherein an end of the rotational shaft is coupled to the sensor, and another end of the rotational shaft is supported on a bearing coupled to the housing.

13. The lean actuator of claim 10, wherein the output shaft and the rotational shaft are connected to each other through a belt.

14. The lean actuator of claim 13, wherein a pulley around which the belt is wound is coupled to the output shaft.

15. The lean actuator of claim 14, wherein a diameter of the pulley is larger than a diameter of the rotational shaft.

16. The lean actuator of claim 13, wherein a bearing is provided to pressurize an outer surface of the belt.

17. A mobility vehicle comprising the lean actuator of claim 1.

* * * * *